United States Patent
Lerner (10) Patent No.: US 6,806,444 B2
(45) Date of Patent: Oct. 19, 2004

(54) HEAT WARNING SAFETY DEVICE USING FIBER OPTIC CABLES

(76) Inventor: William S. Lerner, 215 E. 68th St., Apt. 23 A, New York, NY (US) 10021-5729

( * ) Notice: Subject to any disclaimer, the term of this patent is extended or adjusted under 35 U.S.C. 154(b) by 0 days.

(21) Appl. No.: 10/446,921

(22) Filed: May 28, 2003

(65) Prior Publication Data

US 2003/0192874 A1 Oct. 16, 2003

Related U.S. Application Data

(63) Continuation-in-part of application No. 09/788,594, filed on Feb. 21, 2001, now Pat. No. 6,639,190.

(51) Int. Cl.[7] ................................................ H05B 3/68
(52) U.S. Cl. .................................. 219/445.1; 219/446.1
(58) Field of Search .......................... 219/445.1, 446.1, 219/448.1, 460.1, 465.1; 428/1.1; 349/11, 12, 16, 20, 21

(56) References Cited

U.S. PATENT DOCUMENTS

| | | |
|---|---|---|
| 1,692,012 A | 11/1928 | Wells |
| 2,710,274 A | 6/1955 | Kuehl |
| 3,590,371 A | 6/1971 | Shaw .......................... 116/216 |
| 3,701,344 A | 10/1972 | Walls et al. ................. 126/388 |
| 3,796,884 A | 3/1974 | Tricoire .................... 250/316.1 |
| 3,827,301 A | 8/1974 | Parker .......................... 73/356 |
| 3,893,340 A | 7/1975 | Parker .......................... 73/356 |
| 4,032,687 A | 6/1977 | Hornsby ..................... 428/161 |
| 4,390,275 A | 6/1983 | Schilf et al. ................. 356/43 |
| 4,805,188 A | 2/1989 | Parker ......................... 374/141 |
| 4,891,250 A | 1/1990 | Weibe et al. ................ 374/162 |
| 5,013,893 A | * 5/1991 | Goessler et al. .......... 219/445.1 |
| 5,144,112 A | 9/1992 | Wyatt et al. ................. 219/386 |
| 5,441,344 A | 8/1995 | Cook .......................... 374/141 |
| 5,499,597 A | 3/1996 | Kronberg .................... 116/216 |
| 5,750,959 A | * 5/1998 | Plumptre ................. 219/445.1 |
| 5,997,964 A | 12/1999 | Klima ............................ 428/1 |
| 6,104,007 A | 8/2000 | Lerner ........................ 219/453 |
| 6,639,190 B2 | 10/2003 | Lerner ..................... 219/445.1 |
| 6,700,100 B2 | 3/2004 | Lerner ..................... 219/445.1 |

OTHER PUBLICATIONS

Whirlpool Built–in electric ceramic cooktops, Whirlpool, 3/97 Magic Chef electric cooktop 8670RV & 8770RB, Maytag, 1997.
Dacor's "Touch Top" Cooktops, Dacor, Jan. 1997 Dacor electric convertible cooktops, Dacor, May, 1997.
GE Built–in electric cooktop Model:GE Profile JP350 BV, GE, Summer 1997.

* cited by examiner

Primary Examiner—Sang Paik
(74) Attorney, Agent, or Firm—Steven Horowitz

(57) ABSTRACT

Heat alert safety device for warning individuals that a surface is hot wherein a fiber optic cable runs from an electric light source to a heat warning symbol. The cable has a plurality of fibers connected at a first end thereof to the light source and transmits light from the light source beginning from the first end to the second end of the cable and shines light out of the second end of the cable to a predetermined symbol adjacent the second end of the cable. The symbol is readily visible when illuminated to an observer who can also readily see the surface and the symbol communicates that the surface of the stove, in particular, the heating element, is dangerously hot. A controller controls the light source. Whenever a specified surface temperature is reached, the symbol is lit and remains lit as long as said specified surface temperature is maintained.

34 Claims, 4 Drawing Sheets

HEAT WARNING SAFETY DEVICE USING FIBER OPTIC CABLES

PRIORITY INFORMATION

This patent application is a continuation-in-part patent application of U.S. patent application Ser. No. 09/788,594 previously filed by Applicant and Inventor William S. Lerner on Feb. 21, 2001 now U.S. Pat. No. 6,639,190, and which is incorporated herein by reference in its entirety. This patent application also incorporates herein by reference in its entirety Applicant William S. Lerner's issued U.S. Pat. No. 6,104,007 entitled "Heat Alert Safety Device For Stoves and Related Appliances". This application also claims priority from pending U.S. patent application Ser. No. 10/429,111 filed May 2, 2003 by Applicant Lerner and pending US patent application Ser. No. 10/238,348 filed Sep. 10, 2002 by Applicant Lerner.

FIELD OF THE INVENTION

The field of this invention is heat warning safety devices, and more particularly, such devices for warning individuals that a surface is dangerously hot.

BACKGROUND OF THE INVENTION AND DISCUSSION OF THE PRIOR ART

With respect to stoves and related appliances, various kinds of stoves—electric, gas, smooth cooktop stoves which use glass or metal tops—and toaster ovens are well known to be used for heating food. In addition, "mobile stove-type appliances" such as hot plates and warming trays are well known to be used for heating food. Each of these kinds of stoves and "mobile stove-type appliances" present a safety problem since the heating elements of the stove are hot during the cooking process and remain hot well afterwards. During the cooking process, the safety problem caused by touching the heating element is mitigated somewhat by visual inspection of the stove. With a gas, electric or smooth top stove, for example, the presence of a pot or other utensil on top of the stove might alert someone to the fact that the stove appears to be in use for cooking and therefore too hot to touch. Even the presence of a pot or other utensil is not a reliable clue, however, since people tend to leave tea kettles on their stove perpetually. When the cooking process has ended, however, it is generally impossible to detect that the heating elements of the stove remains hot and would burn the skin of anyone who touched them. There is no visual or other clue that the stove is hot.

To some degree, adults have developed an inherent caution when approaching stoves because of their experience and knowledge in dealing with such safety problems. This inherent caution, however, does not obviate the need for a device that warns the adult when touching the stove would be dangerous. Moreover, children, and particularly young children, usually have not developed such a watchfulness and there has long been a need for a device that can prevent burn accidents to children who may inadvertently touch a stove that is hot, especially when the stove remains hot well after the cooking process has ended.

Furthermore, the reduction in the size of modem kitchens has led the occupants of modern apartments to make use of the stove as an extension of the counter top adjacent the stove as a resting places for large items that have been carried into the kitchen area. An example of such items is heavy bags of groceries brought into the kitchen. There is an urge to set the bags down on the nearest flat surfaces, which may be the top of a stove adjacent a counter top. This is particularly true for those stoves that are smooth on top, such as smooth cooktops. In general, the top surfaces of modern kitchen stoves are increasingly flat, especially the top surfaces of smooth cooktops. These factors have only increased the danger to adults when the top surfaces of stoves are used as a resting place for packages, such as groceries brought into the kitchen.

Smooth cooktop stoves presently are also dangerous if touched on their top surface when they are still hot, even after use. These smooth cooktop stoves, or "smoothtops" as they are sometimes called, utilize as the heating element separate areas on the top surface of the stove (at the same location that gas stove would have burners) which are made of glass. Under each area, usually circular, is a strong light source, such as a halogen lights. The light source projects the light upward to the surface area of the smoothtop's heating element—the glass area on the top surface of the stove. Since the glass area is coated on its bottom with a dark coating, when the light strikes it, the heat from the strong light is absorbed by the glass area and these glass surfaces form each heating element of the stove.

Another variation of the smooth cooktop is the use of a "ribbon heating element" where the smooth glass surface is heated by a coiled electric circuit called a "ribbon element" just underneath it instead of by a halogen light source. The heat is transmitted directly upward so that only the heat element itself gets hot and the rest of the cooktop surface remains cool. In some cases, the ribbon heating element also has another feature whereby the heating element is made of two concentric circles so that the option exists of two sizes of the heating element to match the two different sizes of the pans that need to be heated. This new technology does not solve the problem of warning adults and children that the heating element should not be touched when the cooking process has ended. If anything, it generates the additional hazard that someone can be lulled into touching the heating element after thinking the heating element is cool since the surface right adjacent to it is indeed cool.

Some of these problems have been addressed in Applicant's U.S. Pat. No. 6,104,007 and in pending patent applications, through use of heat warning safety devices that includes a warning symbol that appears directly on the heating element of a stove and by using thermochromic compositions such as for inserts or overlays. Thermochromic materials include liquid crystal (whether cholesteric or chiral nematic) compositions that change color when passing through a given temperature range, and such compositions are now familiar to consumers from their frequent use in inexpensive items, like temperature indicating refrigerator magnets or stick-on aquarium thermometers.

Presently, in order to address the danger of touching a hot "smoothtop" stove, such stoves generally have several light indicators, each one corresponding to each heating element, all located in small one rectangular area on the surface of the cooktop. The light indicators remain lit for a certain length of time after the stove's heating element is turned off in order to deter someone from touching the heating element when it is still hot, although "off". The light indicators themselves consist of a "dot" or red LED or other indicator, each dot corresponding to a different heating element. Unfortunately, this attempt to address the danger of touching a hot stove of the smooth cooktop variety is insufficient as a warning system (putting aside the fact that the light indicators as an indicator of residual heat after the heating element is turned off are presently designed only for the smooth cooktop variety stoves to begin with and not for gas and electric coil stoves).

A quick glance at the group of light indicators would not be sufficient to warn the average adult, no less children or the elderly, that a particular heating element is too hot. This is because the group of light indicators do not immediately tell someone which heating elements correspond to which light indicators. At a minimum, several seconds of concentration are needed in order to determine from the light indicators that are "on", which heating elements are too hot to touch. Many adults, and certainly most children, cannot afford those seconds of deduction since their desire to touch the stove is immediate. In addition, an adult carrying groceries into the kitchen and looking for a counter top to place them on or a child running into and playing in the kitchen are even less likely than the average adult or child to take the time to engage in a several second thinking process. Accordingly, the child or the adult will be inadequately warned about the danger of being burned. With this in mind, it is no surprise that a 1997 industrial design exhibit at the Cooper Hewitt (Smithsonian) in New York demonstrated that over 69% of adults can not match the control knob with its corresponding burner (i.e. heating element) on a stove.

Furthermore, the prior art heat indicators can be up to three feet away from the heating element to which they correspond. That distance is too far away for a dangerously hot surface. Surely one would not position a warning for an open air shaft three feet away.

Moreover, the use of a single red LED dot to communicate a warning of heat, while it may have been noticeable and effective in the kitchen of the past, is completely ineffective today. In today's kitchen environment, the meaning of a dot of a red LED is dramatically diluted by the presence of a multitude of dots of red LED's all over the place in the modem sophisticated kitchen. For example, many appliances in the kitchen such as coffee pots, cell phones, corded phones, answering machines, computers, televisions, rechargeable flashlights, personal digital assistant devices, dustbusters, alarm keypads and motion sensors all have red lights or red LED's which dilute the meaning of a single red LED as an indicator of heat on a near by heating element.

There is also confusion of message from the prior art light indicators. In the electric stove the light goes off when the electric coil is turned off and no residual heat indicator exists. Light "off" means there could still be a danger of heat. In the smooth cooktop the light indicator does stay on when the heating element residually remains hot after being turned off. In this context light "off" means no dangerously hot surface. Thus the red light indicator means two different things depending on the context and this confuses the consumer and dilutes the effectiveness of the indicator lights as warnings.

The above problems with existing heat indicators are even more pronounced when considered in the context of today's modern kitchen. The traditional kitchen in the past has been the domain of a stay at home mother. The kitchen contained one corded telephone and a cooktop stove would be plainly obvious and salient in such a kitchen. Today's kitchen is much more distracting. In today's kitchen, it is more common, at least in many households, for everyone to cook. Furthermore, the kitchen itself in many cases functions also as an entertainment room, a living room or a family room. The kitchen and its inhabitants feature cordless telephones, computers announcing "you have mail", cell phones, pagers and people milling about "multitasking", talking, drinking, socializing and not just cooking. Guests may be unfamiliar with cooking areas. Smoothtop stoves are not so distinctive in this environment since they have been re-designed to blend into the kitchen design. Smoothtops are also not immediately recognizable as smoothtops because the new designs are odd in shape. Also, where previously versions had a vent hood that stuck out, such vent hoods are now often built into the cabinet and remain unseen, thus eliminating the visual cue telling you it is a cooking area. Furthermore, stoves appear in islands in the middle of the kitchen separate from any oven rather than against the wall and adjacent the oven. Hence, a potentially hot surface can be approached from four different directions in a distracting environment when the danger may be hard to recognize, it is not hard to see that the prior art indicators, such as shown in FIG. 1, which appear on only one side of a cooktop stove, are practically useless in today's kitchen, even putting aside the fact that they require precious seconds of deduction to figure out which dangerously hot heating element it is supposed to correspond to the lit indicator warning light.

In addition, some people may not have grown up with smooth cooktops and may not recognize it. The elderly, children, visually impaired individuals would all have trouble using prior art heat warning indicators on a smoothtop to warn against the residual heat of a heating element on a smoothtop stove, or for that matter other stoves or hot surfaces.

Heat alert safety devices based on thermochromic compositions situated in the center of each heating element and containing a predetermined symbol which changes color at a specified temperature has been discussed in Applicant's previous patents and patent applications, including U.S. patent application Ser. No. 09/788,594 filed Feb. 21, 2001 and U.S. patent application Ser. No. 10/429,111 filed May 2, 2003 and the aforementioned U.S. Pat. No. 6,104,007 to Lerner These devices offer many important advantages. One potential drawback, however, is that devices based on thermochromic compositions are limited to heat environments in which the thermochromic composition is reliable at color changing and is stable. Furthermore, a thermochromic composition does not instantly change color but changes color somewhat gradually. Thermochromic compositions are harder to see in the dark or poorly lit room.

Although LED's may contain certain advantages over thermochromic composition when used in heat warning devices, to the extent that the hot surface is the hot surface of a smooth cooktop stove or of a gas stove, any heat warning device that requires electricity near the heating element to activate the warning symbol can be inappropriate. Since gas is combustible, it is undesirable to have an electric current near it. Moreover, with respect to an electric stove having a serpentine electric coil as the heating element, running a new set of electric wires to feed a set of LED's functioning as the warning symbol runs the risk of electromagnetic interference between the different currents. Furthermore, with respect to smooth cooktop stoves, the heating element is formed by having a smooth area of glass or metal on the surface of the stove subjected to a heat source directly underneath that smooth area, for example a halogen lamp. Insulated electric wires running near the halogen lamp or other source of heat could be dangerous since smoothtops get as hot as 800 degrees Fahrenheit.

Consequently, there is a compelling need for a heat warning device that offers a heat warning symbol in an effective manner and in a manner that overcomes the disadvantages of the prior art. It is further desirable to have such a device with a heat warning symbol that does not require running an electric current near the heat warning symbol. Since the heat warning symbol itself necessarily has to be near a strong source of heat and in certain cases a combustible gas or an electric current, it is preferable to have a device that does not require running any electric current near the heat warning symbol. The present invention offers the above compelling advantages and many more advantages.

Preliminarily, moreover, it is noted that the present invention is applicable not just to stoves and related appliances, but to any other surface that one may need to be warned that it is hot, as long as it has access to a light source that can be activated under predetermined conditions. For example, there are numerous devices whose surfaces become hot and remain hot even after the device has been shut off either electrically or otherwise. For example, a radiator cap becomes hot and remains hot for a period when the vehicle and radiator are shut off. Also, any kind of piping that is a conduit for hot liquids is an example of a surface that one may need to be warned that it is hot. Other devices having hot surfaces include hot surfaces on fireplace doors, flat irons, chafing dishes, coffee urns, heating pipes, home radiators, glue guns, oven doors, portable heaters of the electric, oil and ceramic disc type, kerosene lamps, kerosene heaters, barbecue grills of the electric, gas or charcoal type, electric woks, electric skillets, deep fryers for home or commercial use, heat lamps in self service cafeterias and salad bars, saunas including the metal box that generates and/or controls the heat, rotisseries, indoor grills whether gas or electric, tea kettles, wood burning stoves, hot electric rollers, hot wax holders used for beauty treatments, bonnet type hair dryers, synthetic braid trimmers, curling irons, portable generators, steam cleaners especially such as in dry cleaning facilities, hot water pipes that are exposed, hot water heaters, furnaces, warming trays, light fixtures such as halogen lamps, popcorn makers (especially commercial ones), toasters, home and commercial cappucino and espresso makers, autoclaves used to sterilize instruments in a medical setting, movie projectors, industrial steam machines and pressers, the metal surfaces in the cooking areas on an airplane, heat producing generators and many other such hot surfaces. These and other hot surfaces are exposed to children, maintenance works and ordinary adult users.

SUMMARY OF THE PRESENT INVENTION

A heat alert safety device for warning individuals that a surface is hot is provided wherein the device makes use of fiber optic cables that run from an electric light source to a heat warning symbol. The device includes a plurality of fiber optic cables connected at a first end thereof to the light source, the plurality of fiber optic cables transmitting light from the light source from the first end to the second end of said fiber optic cables and shining light out of the second end of said fiber optic cables to a predetermined symbol adjacent the second end of the fiber optic cables. The symbol is readily visible when lit to an observer who can also readily see the surface. The heat warning symbol communicates that the surface of the stove, in particular, the heating element, is dangerously hot. A well known controller controls the electric light source so that whenever a specified surface temperature is reached, the symbol is lit and remains lit as long as said specified surface temperature is maintained.

It should be noted that the device of the present invention can be seen in the dark. This is significant since sometimes people cook or entertain in their kitchen in the dark. For example, when warming a bottle for an infant in the middle of the night, the parent may rely only on the nightlight of 15 Watts and use electric appliances in the dark kitchen.

IMPORTANT OBJECTS AND ADVANTAGES

The following important objects and advantages of the present invention are:

(1) to provide a heat warning device that is able to instantly be illuminated whenever a specified temperature is reached;

(2) to provide such a device that can be adjusted in brightness (and power) depending upon the type of people likely to need the warning of being dangerously hot;

(3) to provide such a device that is reliable and stable regardless of the temperature levels in its environment up to at least 1200 degrees Fahrenheit;

(4) to provide such a device that can be used to warn that a surface of a gas stove may be dangerously hot wherein the fiber optic cable can run through or run adjacent to the gas inlet lines;

(5) to provide a heat warning safety device using a fiber optic cable that is smaller and lighter than electric wires;

(6) to provide a heat warning safety device that is not combustible;

(7) to provide a heat warning safety device that can be better used with electrical appliances since the device is immune to electromagnetic interference;

(8) to provide a heat warning safety device that can be used on electric stoves without using electric wires;

(9) to provide a heat alert safety device that combines visual and auditory cues to maximize warning impact;

(10) to provide a heat warning safety device that allows a person to instantly recognize which hot surface is dangerously hot and needs to be avoided;

(11) to provide a heat alert safety device that alerts people that a surface is dangerously ot even when the heat source that caused the surface to be hot has been turned off;

(12) to provide a heat warning device that is easy to manufacture and can be easily integrated into the manufacturing of known stoves;

(13) to provide a heat warning device that includes a heat warning symbol that appears directly on the heating element of a gas stove, an electric stove or a smooth cooktop or other stove or appliance including but not limited to grills and steamers;

(14) to provide a heat warning safety device that is effective for children, adults, the elderly and visually impaired individuals; and (15) to provide such a heat warning safety device that can be readily seen and be effective in the dark.

DETAILED DESCRIPTION OF THE PREFERRED EMBODIMENT

The apparatus of the present invention will now be illustrated by reference to the accompanying drawings. The device of the present invention has been assigned reference numeral 10 Other elements have been assigned the reference numerals referred to below.

As seen from FIGS. 1–6, a heat alert safety device for warning individuals that a surface on an object is dangerously hot is presented. The device 10 includes a light source 20 that generates a light beam and includes a fiber optic cable 30 formed of a plurality of fibers 31, 32, 33, 34, 45 etc. that is connected at a first end 36 of the fiber optic cable 30 to the light source 20 and oriented so that the plurality of fibers 31, 32, 33, 34, 35, etc. are directly in a path of the light beam. The fiber optic cable 30 transmits the light beam from the light source 20 beginning from the first end 36 of the fiber optic cable 30 to the second end 38 of the fiber optic cable. The second end 38 of the fiber optic cable 30 shines the light beam out of the cable 30.

Fiber optic cables in general are well known, including for interior lighting, although not for the use described in the present invention to the best of Applicant's knowledge. Fiber optic cable 30 consists of a collection of hair-thin glass fibers 31, 32, 33, 34, 35 etc. The cable 30 also includes cladding 39 that surrounds the fibers 31, 32, 33, 34, 35 etc. In accordance with well known fiber optic technology, cladding 39 must have a high index of refractance so that the light transmitted through the cable 30 is internally reflected and travels the length of cable 30 without escaping. Except for the alternative embodiment discussed below, fiber optic cable 30 has a cross-sectional shape that is standard for fiber optic cables.

Typically, light source 20 is an electric light source. It is, however, contemplated by the present invention that a light source other than an electric light source can be used as the light source 20.

A predetermined heat warning symbol 40 is located adjacent the second end 36 of the fiber optic cable 30. The heat warning symbol 40 is readily visible when illuminated to an observer who can also readily see the surface. In a preferred embodiment, the heat warning symbol 40 is not visible at all or very much when not illuminated. Thus the illumination communicates information to the observer. When illuminated, the heat warning symbol communicates that the surface is dangerously hot. Examples of heat warning symbols include the letters "HOT" or equivalents letters in a foreign language, or any other immediately recognizable symbol of dangerous heat.

Figures 1, 7:
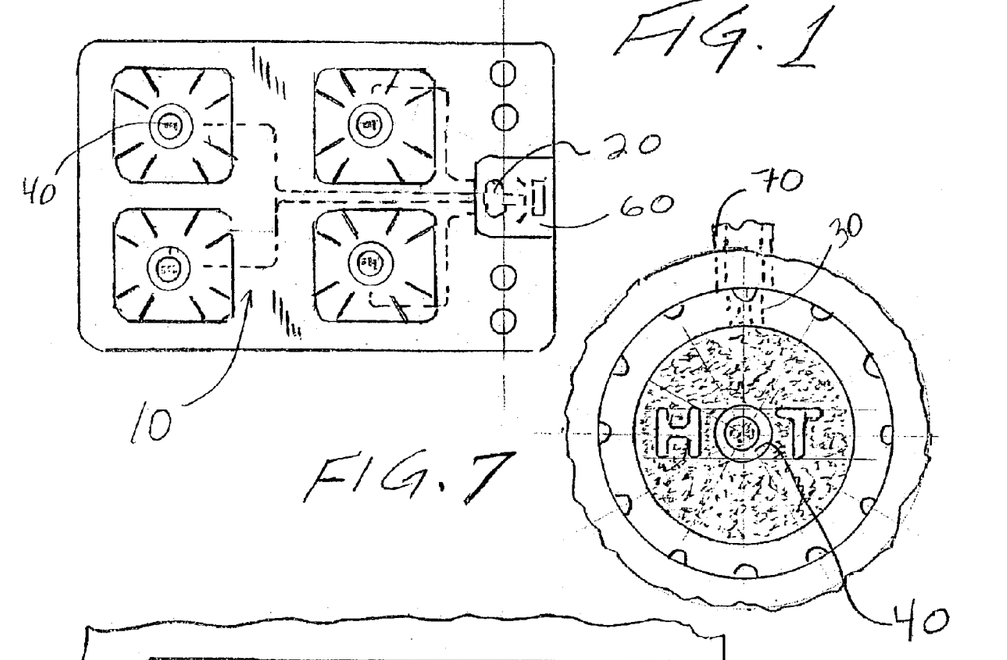
FIG. 1 is a top plan view of the heat warning safety device of the present invention used on a gas stove.
FIG. 7 is an enlarged fragmentary plan view of the heating element of FIG. 2.
Figure 2:
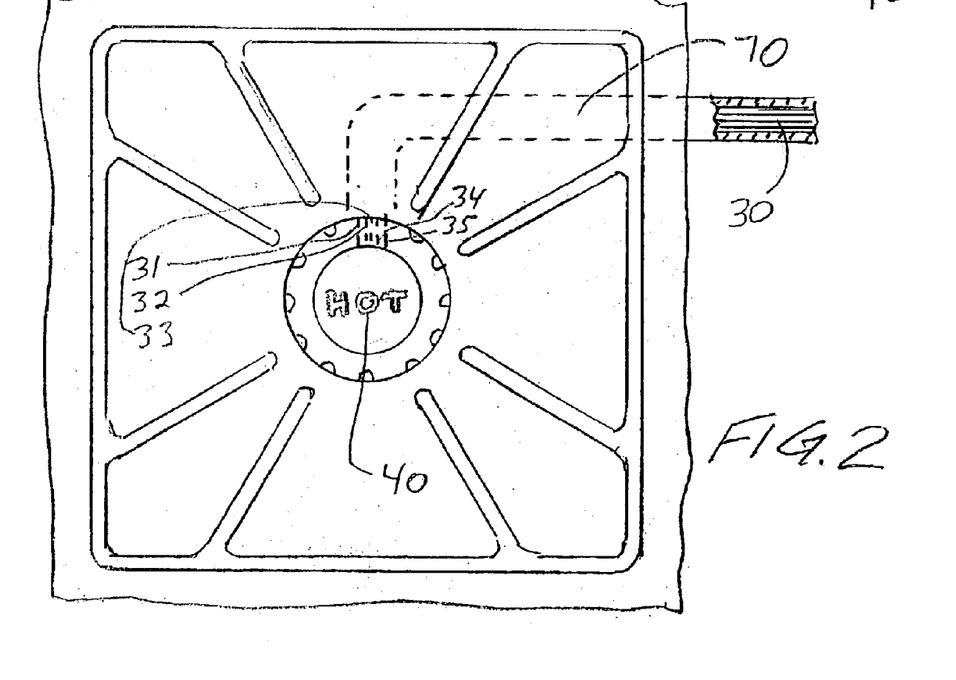
FIG. 2 is an enlarged fragmentary plan view thereof.

In an alternative embodiment shown in FIG. 7, the second end 38 of the fiber optic cable 30 is itself shaped in a form of a predetermined symbol 40. The second end 38 of cable 30 simply terminates beneath a smooth glass (or metal) surface on a top surface of the stove and the symbol 40 is visible beneath when light source is illuminated since the second end 38 of cable 30 is illuminated in a particular shape. The surrounding area would be dark and an observer would only see the second end 38 shaped in the form of heat warning symbol 40 such as the letters "HOT" In the preferred version of this alternative embodiment, by observing second end 38 of cable 30 through the glass of the stove, the observer would be observing the cross-section of cable 30. Whether the remainder of cable 30 is similarly shaped so that the cross section of canle 30 remains constant would be optional. Alternatively, cable 30 has its normal cross-sectional shape (i.e. preferably a circular cross-section) except at second end 38 of cable 30 which second end 38 is shaped to conform to a heat warning symbol 40.

Device 10 also includes a controller 60 controlling the light source 20 in a manner that whenever a specified surface temperature of the surface being warned against is reached, the heat warning symbol is illuminated and remains illuminated as long as the specified surface temperature is maintained. The controller could be or include a computer chip or any other suitable component or thing including hardware or software that tells the light source to go on when a specified temperature is reached. Controller 60 would be located in a preferred embodiment near light source 20 distant from the heating elements or the potentially dangerously hot surface. In one embodiment, controller 60 could be housed in the same compartment or box as light source 20 and sound producing source 24 (described below)

Figure 5:
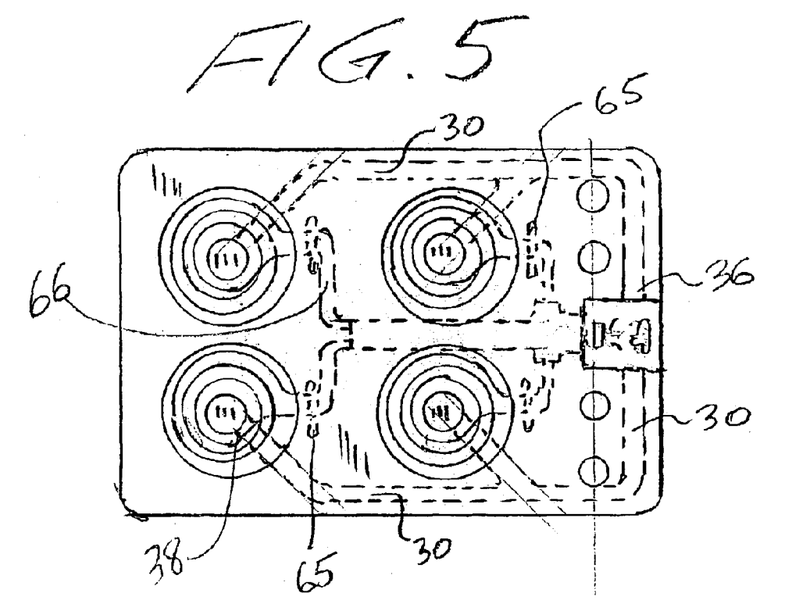
FIG. 5 is a top plan view of the heat warning safety device of the present invention used on an electric stove.
Figure 6:
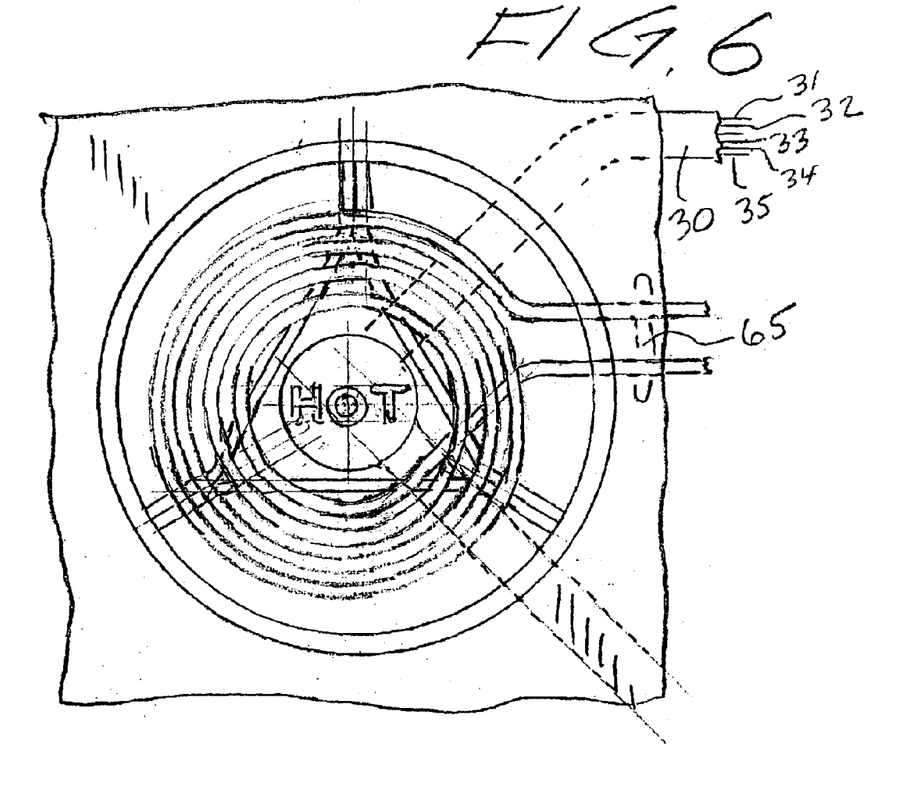
FIG. 6 is an enlarged fragmentary plan view of the heat warning safety device of the present invention used on an electric stove.
Figure 8:
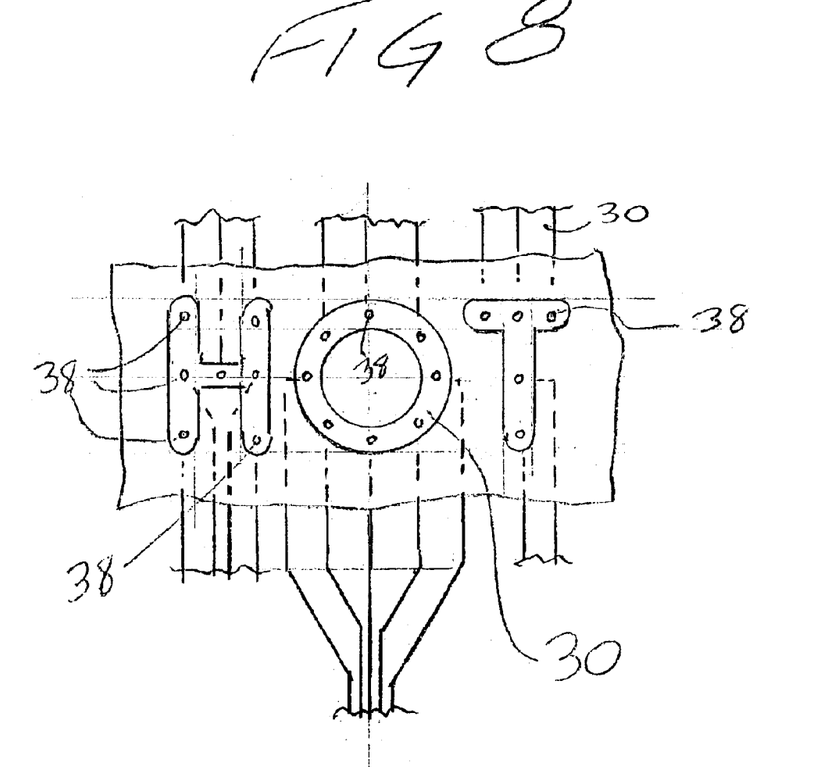
FIG. 8 is a perspective view of an alternative embodiment of a fiber optic cable of the present invention in which the cable is shaped in the form of a heat warning symbol.

Controller 60 would receive information about the temperature of the heating element in a manner well known in the art. Presently, heat indicators consisting of a dot of LED poorly positioned on the stove or other surface operate by receiving information about the temperature of the heating element or other surface and then they convert that information into an LED that is lit. In the present invention, for example, as best seen in FIGS. 5–6, there could be heat sensors 65 adjacent each heating element that is connected by wire to the controller distant from the heating elements. Heat sensor 65 ascertains the surface temperature, for example, the temperature of a heating element, and communicates that temperature to the controller 60. Heat sensor communication lines 66 are shown in FIG. 5. Although heat sensors 65 and heat sensor communication lines 66 are included in all embodiments including those shown in FIGS. 1–4 and FIGS. 7–8, they have been omitted from the views in these embodiments.

In a case where the surface that is being warned against is the heating elements of a stove (for example a gas stove, an electric stove, or a smooth cooktop stove) or the area of the top surface of a stove where the heating elements are located, then typically, although not necessarily, the light source would also be located on the top surface of the stove as far removed from the heating elements as possible. In one embodiment, the light source would be near the control knobs of the stove.

In a preferred embodiment, the second end 38 of the fiber optic cable 30 is oriented so as to shine light at the heat warning symbol in a direction perpendicular to the top surface of the stove on which the heating elements appear This would presumably maximize illumination of the heat warning symbol 40 using the minimum amount of electric power. The present invention, however, contemplates any orientation of the second end 38 of fiber optic cable 30 that suffices to illuminate heat warning symbol 40.

It is known that fiber optic cables should be protected from ultra violet radiation which degrade the fiber and affect its longevity. It is contemplated by the present invention to protect cable 30 from UV radiation either using the standard Lexan® tubing a special PVC-type jacketing. However, in a preferred embodiment, the present invention contemplates filtering out UV radiation using a special glass-ceramic panel called Ceran® made by Schott HomeTech North America, which is located in Louisville, Ky. Ceran® is used on millions of cooktop stoves. A clear version of Ceran® is called Robax®. Robax® is highly transparent and therefore appropriate for the top surface of smooth cooktop stoves yet according to Schott HomeTech, Robax® is an effective filter to ultra violet radiation since it nearly blocks all wavelengths below 400 nm. Accordingly, the mere use of Robax® as the top surface of the smooth cooktop would render unnecessary any special UV filtering mechanism for cable 30 in the context of a cooktop stove.

Device 10 may also include switch 90 that is accessible to a user. In a preferred embodiment switch 90 is located on the object containing the surface that the heat warning symbol 40 is warning may be dangerously hot. Switch 90 is used to turn the heat warning safety device 10 on or off, for example by tuning the light source 20 itself on or off. Device 10, in certain embodiments, also includes a device indicator 80 that notifies the user whether device 10 is functional and can be relied on. If device 10 includes switch 90 then in certain embodiments device indicator 80 would be go on when switch 90 is turned on provided light source 20 is also functional. Alternatively, device indicator 80 is not affected by switch 90 but is a permanent indicator that independently changes indication mode whenever light source 20 becomes nonfunctional and needs to be replaced or adjusted. Hence, a user knows whether to rely on device 10.

The following are typical placements of the light source 20, although other placements are well within the spirit of the present invention. When the object is a stove and the surface on the top of the stove where the heating elements are is the surface that may be dangerously hot, light source 20 is typically located immediately beneath a portion of a top surface of the stove at a maximum surface distance from the heating elements of the stove. If the stove is a gas stove and the surface is a surface of a heating element on the gas stove, the heat warning symbol 40 may be positioned in a center of the heating element and the second end 38 of fiber optic cable 30 may be is positioned beneath the heating element. In a gas stove the beating element is a metal grate having an open area in the center of the metal grate. In an electric stove the surface is a surface of a heating element on an electric stove, heat warning symbol 40 may be positioned in a center of the heating element and second end 38 of the fiber optic cable 30 may be positioned beneath an area of the heating element. For an electric stove the heating element is a serpentine electric coil. In certain embodiments, the device can include a disk 45 in the center of the coil wherein the heat warning symbol 40 is positioned on the disk.

Where the object is a smooth cooktop stove and the surface is a surface is of a heating element of the smooth cooktop stove, symbol 40 may be positioned in a center of the heating element and second end 38 of the fiber optic cable 30 may be positioned beneath an area of the heating element. In a smooth cooktop the heating element is a smooth area of glass or metal on a top surface of the stove that absorbs heat from a heat source directly underneath the smooth area of glass or metal.

In certain embodiments, for example where the dangerously hot surface is the heating element of smooth cooktop stove the symbol 40 may be positioned surrounding the heating element. See for example, FIG. 9A of U.S. Pat. No. 6,104,007 to Lerner incorporated herein by reference. In that case, second end 38 of fiber optic cable 30 may be positioned beneath an area of the heating element—either beneath the heating element or beneath the symbol 40.

Int should be noted in general that second end 38 of cable 30 need not be immediately adjacent heat warning symbol 40. It need only be close enough to illuminate heat warning symbol 40. Accordingly, the fact that a halogen lamp or other heat source may be positioned underneath the heating element of a smooth cooktop stove is not a factor that interferes with the placement of device 10 and in particular with the placement of the second end 38 of cable 30.

In a gas stove, the heating element is fed by gas inlet lines 70. Then fiber optic cable 30 can even run through the gas inlet lines 70 since fiber optic cables are not combustible and are not carrying electricity. Furthermore, fiber optic cables are known to withstand temperature of 1200 degrees Fahrenheit. Alternatively, the fiber optic cable 30 can run alongside gas inlet lines 70.

Figure 3:
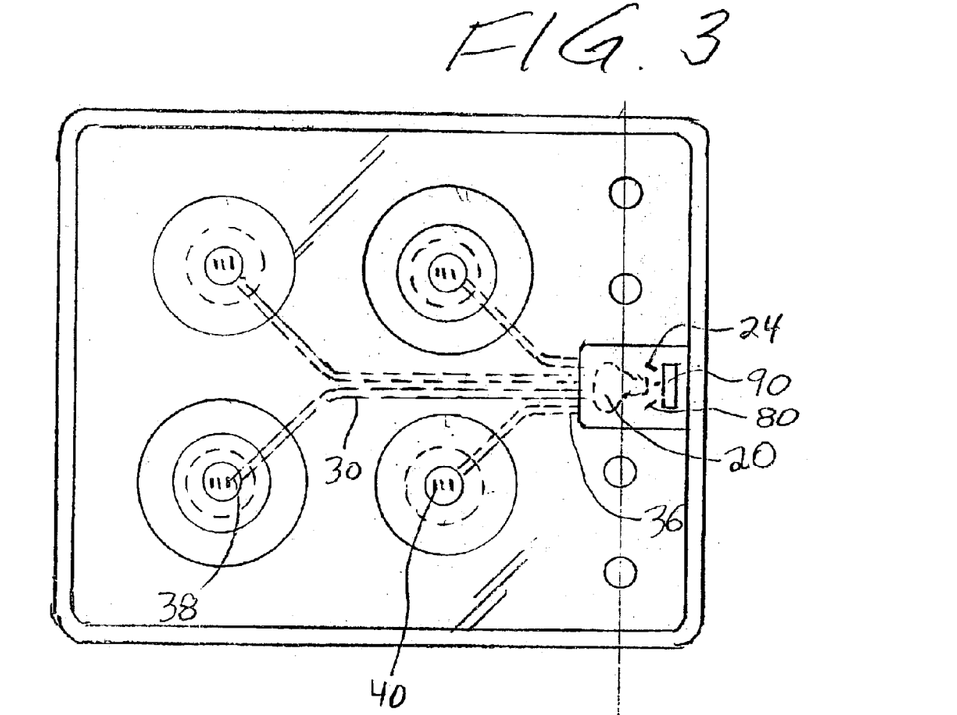
FIG. 3 is a top plan view of the heat warning safety device of the present invention used on a smooth cooktop stove.
Figure 4:
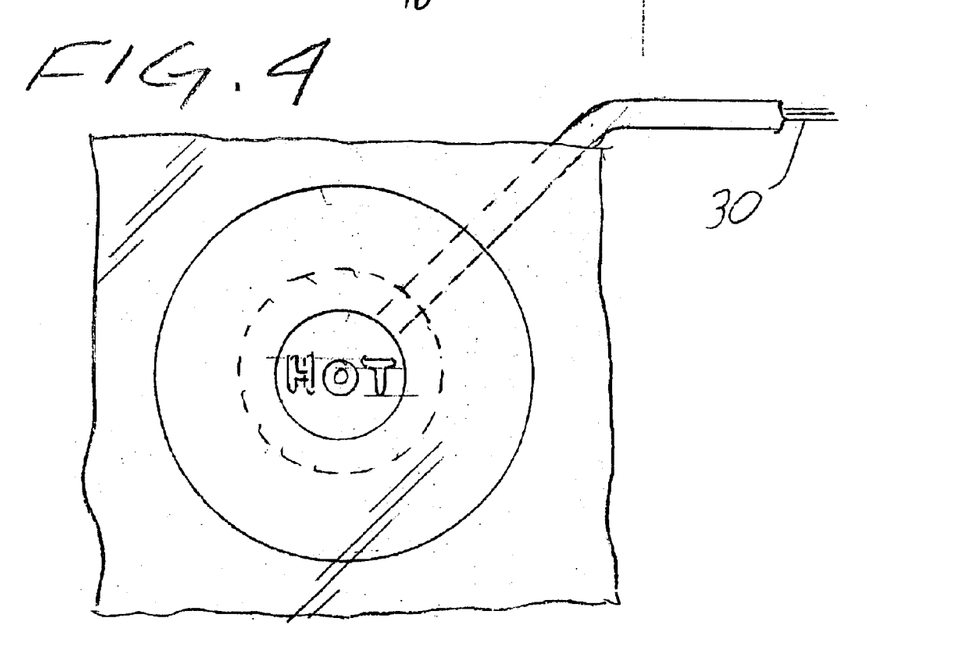
FIG. 4 is an enlarged fragmentary plan view of the heat warning safety device of the present invention on a smooth cooktop stove.

It should be noted that although FIGS. 1, 3 and 5 appear to show the fiber optic cables running in a straight line from the light source only a short span, in actuality in one embodiment the fiber optic cables leave the light source and come out in a straight line for a few feet. This is done deliberately to the fact that light does not respond well to bending and that fiber optic cables work best when they allow the light to first have a short straight run. It is noted, however, that as long as the cables are not bent at hard right angles, and preferably not more than eight times the diameter of the cable, the fiber optic cables can be bent and can be bent without even creating a lighting hot spot.

Alternatively, the fiber optic cables leave the light source and come out in a straight line for some distance less than a few feet, for example one foot, and this is sufficient in this case since the quantity of illumination needed to shine on the heat warning symbol at the end of the cables is quite small. It is estimated to be well below 25 watts. Furthermore, the light source can be a halogen bulb or other appropriate light source and the power of this light source can be increased to obtain the desired intensity of illumination at the second end of the fiber optic cables taking into consideration the fact that the cables have an initial straight run coming out of the light source of fewer than a few feet. Alternatively, or in addition if necessary, other steps can be taken such as increasing the diameter of the fiber optic cable, placing a fish eye lens or a hemispheric reflector at the second end of the fiber optic cable to increase the illumination of the light on the heat warning symbol. If possible, a reflector can also be put behind the light source.

In this patent application the term "maximum surface distance" refers to a point that is approximately the furthest distance on the surface of the object from the reference point. For example, the light source may be said to be at a maximum distance from the heating elements on the surface of a stove.

The device 10 of the present invention also allows the brightness of the heat warning symbol 40 to be adjusted depending upon the individuals who are likely to need the warning that the surface may be dangerously hot. Controller 60 would adjust light source 20 in the same manner that controller does the turning on of light source 20 using well known means and based on a setting chosen by the user. The setting would appear on switch 90 or with a separate switch.

Another feature of the present invention is that a sound producing component 24 can produce a sound warning whenever the light source is on. This is not just advantageous to visually impaired individuals. For all individuals, it compounds the effect of the warning. To achieve this objection, one need only have to have a sound producing device 77 that is connected to the controller 60. Obviously, the nature, length, volume and other characteristics of the sound alarm can also be adjustable and can be controlled by software.

The advantage of these additional features is seen from the following example. Consider a single young male who lives alone. He may typically maintain the brightness level at a low level at all times. This is because he sees well and is not distracted and also because when he entertains he does not want to unnecessarily visually clutter or detract from the appealing appearance of his smooth cooktop. When he gets married, his wife is protective and turns up the brightness of the device 10 to protect the children who she is fearful may not see a low level warning device 10. When their elderly parents come to visit they turn up the power of the light source further and put the sound feature on.

It is to be understood that while the apparatus of this invention have been described and illustrated in detail, the above-described embodiments are simply illustrative of the principles of the invention. It is to be understood also that various other modifications and changes may be devised by those skilled in the art which will embody the principles of the invention and fall within the spirit and scope thereof. It is not desired to limit the invention to the exact construction and operation shown and described. The spirit and scope of this invention are limited only by the spirit and scope of the following claims.

What is claimed is:

1. A heat alert safety device for warning individuals that a surface of an object is hot, comprising a light source that generates a light beam, a fiber optic cable formed of a plurality of fibers, said fiber optic cable connected at a first end of said fiber optic cable to the light source and oriented so that the plurality of fibers are directly in a path of the light beam, said fiber optic cable transmitting the light beam from the light source beginning from the first end to the second end of said fiber optic cable, the second end of said fiber optic cable shining the light beam out of the cable, a predetermined symbol adjacent the second end of the fiber optic cables, the symbol readily visible only when illuminated to an observer who can also readily see the surface, said symbol communicating that the surface is dangerously hot, a controller controlling the light source so that whenever a specified surface temperature is reached, the symbol is illuminated and remains illuminated as long as said specified surface temperature is maintained, and heat sensor adjacent the surface and connected to the controller for ascertaining a surface temperature and communicating the surface temperature to the controller.

2. The device of claim 1, wherein the light source is located on the object.

3. The device of claim 2, wherein the object is a stove and the light source is located immediately beneath a portion of a top surface of the stove and wherein said light source is at a maximum surface distance from the heating elements of the stove.

4. The device of claim 1, wherein the object is a gas stove and the surface is a surface of a heating element on the gas stove, wherein the symbol is positioned in a center of the heating element and wherein the second end of the fiber optic cable is positioned beneath the heating element.

5. The device of claim 4, wherein the heating element is fed by gas inlet lines and wherein the fiber optic cables run through the gas inlet lines.

6. The device of claim 4, wherein the heating element is fed by gas inlet lines and wherein the fiber optic cables run alongside the gas inlet lines.

7. The device of claim 4, wherein the heating element is a metal grate having an open area in the center of the metal grates.

8. The device of claim 1, wherein the object is an electric stove and the surface is a surface of a heating element on an electric stove, wherein the symbol is positioned in a center of the heating element and wherein the second end of the fiber optic cable is positioned beneath an area of the heating element.

9. The device of claim 8, wherein the heating element is a serpentine electric coil having a disk in the center and wherein the symbol is positioned on the disk.

10. The device of claim 1, wherein the object is a smooth cooktop stove and the surface is a surface is of a heating element of the smooth cooktop stove, wherein the symbol is positioned in a center of the heating element and wherein the second end of the fiber optic cable is positioned beneath an area of the heating element.

11. The device of claim 10, wherein the heating element is a smooth area of glass or metal on a top surface of the stove that absorbs heat from a heat source directly underneath said smooth area of glass or metal.

12. The device of claim 1, wherein the object is a smooth cooktop stove and the surface is a surface is of a heating element of the smooth cooktop stove, wherein the symbol is positioned surrounding the heating element and wherein the second end of the fiber optic cable is positioned beneath an area of the heating element.

13. The device of claim 12, wherein the heating element is a smooth area of glass or metal on a top surface of the stove that absorbs heat from a heat source directly underneath said smooth area of glass or metal.

14. The device of claim 1, wherein said device also includes a switch for turning the device on or off.

15. The device of claim 1, wherein a device indicator notifies the user whether the device is functional.

16. The device of claim 1, wherein a degree of brightness of the light source is controlled by the controller based on a setting set by a user.

17. The device of claim 1, wherein a sound producing component controlled by the controller produces a sound alarm whenever the light source is turned on.

18. A heat alert safety device for warning individuals that a surface of an object is hot, comprising a light source that generates a light beam, a fiber optic cable formed of a plurality of fibers, said fiber optic cable connected at a first end of said fiber optic cable to the light source and oriented so that the plurality of fibers are directly in a path of the light beam, said fiber optic cable transmitting the light beam from the light source beginning from the first end to the second end of said fiber optic cable, the second end of said fiber optic cable shining the light beam out of the cable, the second end of the fiber optic cables shaped in a form of a predetermined symbol, the symbol readily visible only when illuminated to an observer who can also readily see the surface, said symbol communicating that the surface is dangerously hot, a controller controlling the light source so that whenever a specified surface temperature is reached, the symbol is illuminated and remains illuminated as long as said specified surface temperature is maintained, and heat sensor adjacent the surface and connected to the controller for ascertaining a surface temperature and communicating the surface temperature to the controller.

19. The device of claim 18, wherein the light source is located on the object.

20. The device of claim 19, wherein the object is a stove and the light source is located immediately beneath a portion of a top surface of the stove and wherein said light source is at a maximum surface distance from the heating elements of the stove.

21. The device of claim 18, wherein the object is a gas stove and the surface is a surface of a heating element on the gas stove, wherein the symbol is positioned in a center of the heating element and wherein the second end of the fiber optic cable is positioned beneath the heating element.

22. The device of claim 21, wherein the heating element is fed by gas inlet lines and wherein the fiber optic cables run through the gas inlet lines.

23. The device of claim 21, wherein the heating element is fed by gas inlet lines and wherein the fiber optic cables run alongside the gas inlet lines.

24. The device of claim 21, wherein the heating element is a metal grate having an open area in the center of the metal grates.

25. The device of claim 18, wherein the object is an electric stove and the surface is a surface of a heating element on an electric stove, wherein the symbol is positioned in a center of the heating element and wherein the second end of the fiber optic cable is positioned beneath an area of the heating element.

26. The device of claim 25, wherein the heating element is a serpentine electric coil having a disk in the center and wherein the symbol is positioned on the disk.

27. The device of claim 18, wherein the object is a smooth cooktop stove and the surface is a surface is of a heating element of the smooth cooktop stove, wherein the symbol is positioned in a center of the heating element and wherein the second end of the fiber optic cable is positioned beneath an area of the heating element.

28. The device of claim 27, wherein the heating element is a smooth area of glass or metal on a top surface of the stove that absorbs heat from a heat source directly underneath said smooth area of glass or metal.

29. The device of claim 18, wherein the object is a smooth cooktop stove and the surface is a surface is of a heating element of the smooth cooktop stove, wherein the symbol is positioned surrounding the heating element wherein the second end of the fiber optic cable is positioned beneath an area of the heating element.

30. The device of claim 27, wherein the heating element is a smooth area of glass or metal on a top surface of the stove that absorbs heat from a heat source directly underneath said smooth area of glass or metal.

31. The device of claim 18, wherein said device also includes a switch for turning the device on or off.

32. The device of claim 18, wherein a device indicator notifies the user whether the device is functional.

33. The device of claim 18, wherein a degree of brightness of the light source is controlled by the controller based on a setting set by a user.

34. The device of claim 18, wherein a sound producing component controlled by the controller produces a sound alarm whenever the light source is turned on.

* * * * *